UNITED STATES PATENT OFFICE.

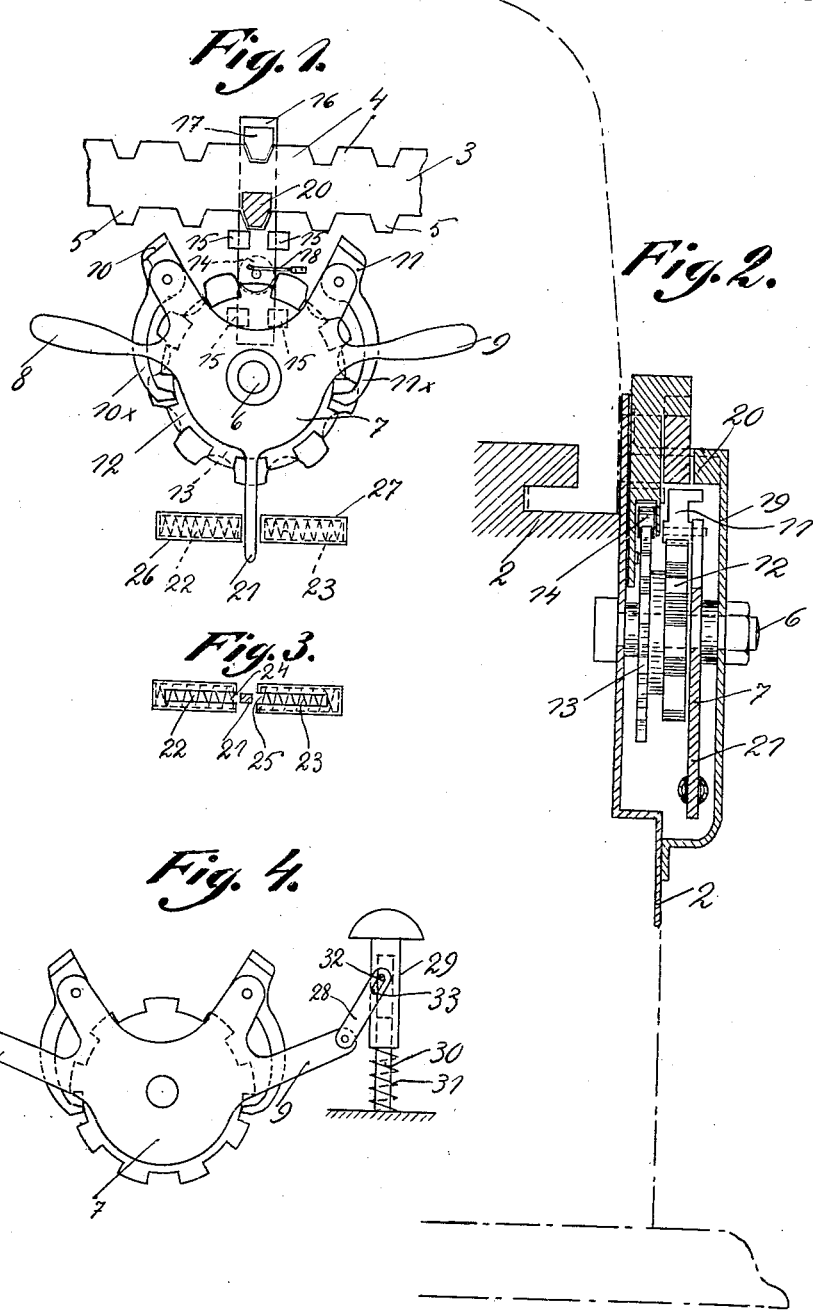

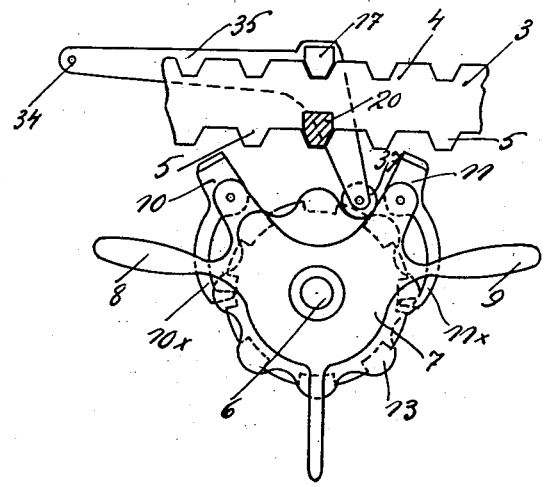

VALENTIN JAKOB ODHNER, OF STOCKHOLM, SWEDEN.

CALCULATING-MACHINE.

1,371,185.   Specification of Letters Patent.   Patented Mar. 8, 1921.

Application filed June 28, 1919. Serial No. 307,339.

*To all whom it may concern:*

Be it known that I, VALENTIN JAKOB ODHNER, a subject of the King of Sweden, and resident of Karlaplan 2, Stockholm, in the Kingdom of Sweden, have invented certain new and useful Improvements in Calculating-Machines, of which the following is a specification, reference being had therein to the accompanying drawings.

This invention relates to a device for shifting or moving step by step the carriage of calculating machines of the type described in Patent No. 514725. This device is so arranged, that the shifting is positively interrupted, as the carriage has been moved one step, so that the carriage is prevented from being moved farther by the momentum imparted to the same during the motion, if the shifting device should have been actuated too forcibly.

In the accompanying drawings Figure 1 is a side view of one form of the shifting device. Fig. 2 is a vertical section of the same. Fig. 3 is a detail. Fig. 4 shows in a side view a second form of the shifting device. Fig. 5 shows in a side view a third form of the shifting device. Fig. 6 shows in a side view partially in section a fourth form of the device. Fig. 7 is a detail.

1 is the carriage which in the calculating machine shown in Fig. 2 is mounted in a guide provided on the top of the casing 2 of the machine. To the carriage a bar 3 is fixed, which is provided with teeth 4, 5 in each of its edges. A part 7 is swingably mounted on a pin 6 fixed to the casing 2. The said part 7 is provided with arms 8, 9 by means of which the part may be swung manually in one or the other direction. The part 7 carries two catches 10, 11, coöperating with the bar 3 for the moving of the carriage in one or the other direction. From the catches tail-pieces $10^x$, $11^x$ extend in opposite directions and engage with play a toothed wheel 12 rotatably mounted on the pin 6. A cam disk 13 is fixed to or made integral with the toothed wheel 12, the peripheral surface of which is undulated and has as many waves as there are teeth in the wheel 12. The cam disk 13, which acts in the same manner in both directions, actuates a roller 14 which is provided on a piece 16 movable in guides 15 transversely of the carriage 1 and provided with a tooth 17, which normally engages the teeth 4 of the bar 3. The said piece 16 is actuated toward the cam disk 13 by a spring 18 fixed to the casing 2. The shifting device is inclosed in a box 19 fixed to the casing, which box 19 has a projection or abutment 20 for the purpose stated below. From the part 7 an arm 21 extends downward, which is located between two springs 22, 23, provided in two sleeves 26, 27 and holding the part 7 in its normal position, shown in Figs. 1 and 3. The said sleeves have slots 24, 25 for the arm 21 and at their open ends abutments for the springs are provided in order that the springs may not leave the sleeves.

The described device operates in the following manner. If the carriage is to be moved toward the left the left arm 8 is depressed. The catch 10, $10^x$ then turns the toothed wheel 12 together with the cam disk 13 toward the left, so that the piece 16 is raised and the tooth 17 is disengaged from the bar 3. The catch 11 then engages a tooth 5 of the bar 3 and moves the bar together with the carriage toward the left, until the catch 11 strikes the stationary abutment 20. The carriage has then been moved for one step. As the movement has been effected the catch 11 is located between the abutment 20 and the next tooth 5 and thus prevents the carriage from moving forward more than one step, even if the part 7 should have been actuated too forcibly, so that there is a tendency of the carriage to move farther. Immediately after the shifting operation the piece 16 descends and the tooth 17 enters between two teeth 4 and locks the bar 3 and the carriage in the new position. Consequently, the only object of the tooth 17 is to lock the carriage in the adjusted position and not to limit the movement of the carriage, as is the case in calculating machines hitherto known, which function the said tooth 17 never can perform in a satisfactory manner, as has been demonstrated in actual practice. As the arm 8 is released, the part 7 is returned to its normal position by the spring 23, during which movement the tail-piece $10^x$ rides on the next tooth of the wheel 12 and engages the same, while the tail-piece $11^x$ acted upon by the tooth 5 located behind the catch 11 is disengaged from the toothed wheel 12 and then enters the next notch of the toothed wheel. The device operates in the same manner as the arm 9 is actuated for moving the carriage toward the right.

The form of the invention shown in Fig.

4 differs from the device described above only by the arms 8, 9 of the part 7 being connected with keys or push buttons 29 (one only shown) by a link 28. The said key is slidably mounted on a stationary pin 30 and acted upon by a spring 31. The said link 28 is connected with the key 29 by means of a pin and slot joint 32, 33 in order to permit the part 7 to rotate in both directions.

In the form of the invention illustrated in Fig. 5, which shows the preferred form of the arresting device, the tooth 17, engaging the teeth 4 of the bar 3, is provided on an arm 35, pivoted at 34. In the said figure the arm 35 is elbow-shaped and the tooth 17 is located at the bend. The free end of the arm is provided with a roller 37 bearing against the cam disk 13, so that, as the cam disk is rotated the arm 35 is raised and the tooth 17 disengaged from the bar 3. After the shifting of the carriage for one tooth, the arm 35 drops (acts if necessary by a spring) and the tooth 17 again engages the rod 3. The pin 34 preferably is located on a level with the teeth 4 of the bar 3, so that the tooth 17 is raised straight upward from the bar 3. The resistance to be overcome at the disengaging of the arm 35 from the bar 3 consists, in addition to the weight of the arm (and, it may be, the pressure of a spring) only of the slight friction existing at the pin 34. The resistance exerted by the said friction is easily overcome owing to the long lever arm upon which the cam disk 13 acts. The arm 35 preferably is so bent, that the line connecting the pin 34 with the pin of the roller 37 forms a substantially right angle with a line connecting the pin last mentioned with the pin 6, in order that there may be the same resistance against the swinging of the arm 35, regardless of the direction in which the cam disk 13 is rotated.

38, 39 in the device shown in Fig. 6, are two keys for the swinging of the part 7 in one or the other direction respectively. The keys are arranged in the same manner, for which reason only one of the same is described. The key is movable in a guide provided in the frame of the machine and is acted upon by a spring 40, bearing against the said frame and a ring 40× fixed to the key rod. The key is provided at its lower end with a button 41, which extends straight forward and by means of which the key may be depressed by means of a finger. At the top end of the key rod a lateral projection or tooth 42 is provided. Normally the said tooth 42 is located outside the path of an abutment 43 on the swingable part 7. In Fig. 6 the said part is half-moon shaped and its top edge forms the abutments for the teeth 42. The part 7 may however have any other suitable shape. As the key 39 is depressed, the tooth 42 enters into the path of the abutment 43 in consequence of its position and rectilinear movement and strikes the abutment, thus swinging the part 7 and causing the catch 10 (or 11 respectively) to move the carriage. As the key is released the spring 40 returns the same to the shown normal position.

According to Fig. 7 the key rod 39 has a notch 44, engaged by a wedge shaped plug 45, movable in a guide in the frame and acted upon by a spring 46. Owing to the fact that the part 7, Fig. 6, is returned to its normal position by the springs 22, 23 respectively, in the same manner as stated with reference to Figs. 1 and 3, during which movement it brings with itself the tooth 42 and the key, the latter is returned nearly to its upper position. The last part of the upward movement of the key is effected by the wedge shaped plug 45, which when pushed into the notch 44, acts upon its slanting top side and moves the key upward for a farther distance. The key is then held in its position by the plug.

The invention may evidently be modified in many respects without exceeding the limits of the same.

Having now described my invention, what I claim as new and desire to secure by Letters Patent is:

1. In a device for shifting step by step the carriage of calculating machines the combination with a manually actuated part and a row of teeth or the like provided on the said carriage, of catches provided on the said part and adapted to engage the said teeth in opposite directions, abutments for the said catches, while engaging the teeth, and a stationary abutment, between which and the next tooth of the carriage the acting catch is located after the shifting of the carriage, substantially as described and for the purpose set forth.

2. In a device for shifting step by step the carriage of calculating machines the combination with a manually actuated rotatable part and a row of teeth or the like provided on the said carriage, of catches provided on the said part and adapted to engage the said teeth in opposite directions, a toothed wheel, connected with the said part, tail pieces provided on the said catches and engaging the teeth of the said wheel, a cam disk actuated by the said toothed wheel, and an arresting part actuated by the said cam disk and engaging a row of teeth or the like provided on the carriage, substantially as described and for the purpose set forth.

3. In a device for shifting step by step the carriage of calculating machines the combination with a manually actuated rotatable part and a row of teeth or the like provided on the carriage, of catches provided on the said part and adapted to engage the said teeth in opposite directions, abutments for the said catches, while engaging the teeth, an arm or the like extending from the said part, springs located on opposite sides of the said arm and adapted to return the part into its normal position, and abutments for the actuating ends of the springs.

4. In a device for shifting step by step the carriage of calculating machines the combination with a manually actuated, rotatable part and rows of teeth or the like provided on the said carriage, of catches provided on the said part and adapted to engage and move the teeth of one of said rows in opposite directions, a toothed wheel, connected with the said part, tail pieces provided on the said catches and engaging the teeth of the said wheel, a stationary abutment, between which and the next tooth of the carriage the acting catch is located after the shifting of the carriage, a cam disk actuated by the said toothed wheel, a member actuated by the said cam disk, and a tooth or the like provided on the said member and engaging the teeth of the other row on the said carriage for locking the same in adjusted position.

5. In a device for shifting step by step the carriage of calculating machines the combination with a manually actuated rotatable part and a row of teeth or the like provided on the said carriage, of catches provided on the said part and adapted to engage the said teeth in opposite directions, a toothed wheel, connected with the said part, tail pieces provided on the said wheel, and engaging the teeth of the said wheel, a cam disk actuated by the said toothed wheel, an elbow shaped lever arm actuated by the said cam disk and a tooth or the like provided on the said lever arm and engaging a row of teeth or the like on the said carriage for locking the same in adjusted position, the fulcrum of the said lever arm being located substantially on a level with the row of teeth last mentioned, substantially as shown in the drawings and for the purpose set forth.

6. In a device for shifting step by step the carriage of calculating machines the combination with a rotatable part and a row of teeth or the like provided on the said carriage, of catches provided on the said part and adapted to engage the said teeth in opposite directions, abutments for the said catches, while engaging the teeth, abutments on the said rotatable part, spring actuated keys located on opposite sides of the fulcrum of said part and projections on the said keys, normally located outside the path of the abutments last mentioned and adapted to engage the same, as the keys are actuated.

VALENTIN JAKOB ODHNER.